United States Patent
Xu et al.

(10) Patent No.: US 9,077,142 B2
(45) Date of Patent: Jul. 7, 2015

(54) AIR-COOLED LASER DEVICE

(71) Applicant: SHANGHAI JIAO TONG UNIVERSITY, Shanghai (CN)

(72) Inventors: Jianqiu Xu, Shanghai (CN); Rui Zhang, Shanghai (CN); Jinzi Huang, Shanghai (CN); Cong Wang, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 14/151,899

(22) Filed: Jan. 10, 2014

(65) Prior Publication Data

US 2014/0126592 A1 May 8, 2014

Related U.S. Application Data

(63) Continuation-in-part of application No. 13/207,000, filed on Aug. 10, 2011, now abandoned.

(30) Foreign Application Priority Data

Mar. 15, 2011 (CN) .......................... 2011 1 0060968

(51) Int. Cl.
| | |
|---|---|
| *H01S 3/042* | (2006.01) |
| *H01S 3/04* | (2006.01) |
| *H01S 3/093* | (2006.01) |
| *H01S 3/16* | (2006.01) |
| *H01S 3/06* | (2006.01) |
| *H01S 3/0941* | (2006.01) |

(52) U.S. Cl.
CPC ............... *H01S 3/0405* (2013.01); *H01S 3/093* (2013.01); *H01S 3/1673* (2013.01); *H01S 3/042* (2013.01); *H01S 3/0612* (2013.01); *H01S 3/0941* (2013.01); *H01S 3/0404* (2013.01); *H01S 2301/02* (2013.01)

(58) Field of Classification Search
CPC ........ H01S 3/0405; H01S 3/042; H01S 3/093
USPC .......................................... 372/36, 41, 75, 83
See application file for complete search history.

(56) References Cited

U.S. PATENT DOCUMENTS

| | | | | |
|---|---|---|---|---|
| 4,024,466 | A * | 5/1977 | Cremosnik ..................... 372/26 |
| 5,553,088 | A * | 9/1996 | Brauch et al. .................. 372/34 |
| 5,796,766 | A * | 8/1998 | Hargis et al. ................... 372/36 |
| 5,974,061 | A * | 10/1999 | Byren et al. ................... 372/34 |
| 2007/0291803 | A1 * | 12/2007 | Crum ............................ 372/34 |

* cited by examiner

*Primary Examiner* — Julio J Maldonado
*Assistant Examiner* — Michael Carter
(74) *Attorney, Agent, or Firm* — Anova Law Group, PLLC

(57) ABSTRACT

Air-cooled laser devices and formation methods are provided. An exemplary air-cooled laser device can include at least a laser active slab, a first silicon carbide clad, a second silicon carbide clad, a first laser diode array, and a first cylindrical lens. The first and second silicon carbide clads can be symmetrically bonded to the laser active slab and can have a surface area greater than the laser active slab to form an air duct surrounding side surfaces of the laser active slab and between the silicon carbide clads. The first laser diode array can emit first input pump laser beams to be collimated by the first cylindrical lens to provide parallel and quasi-parallel pump laser beams that are guided by the air duct to enter into the laser active slab from at least a first side surface of the laser active slab.

18 Claims, 4 Drawing Sheets

AIR-COOLED LASER DEVICE

CROSS-REFERENCES TO RELATED APPLICATIONS

This application is a continuation in part of U.S. patent application Ser. No. 13/207,000, filed on Aug. 10, 2011, which claims the priority of Chinese patent application number 201110060968.X, filed on Mar. 15, 2011, the entire contents of all of which are incorporated herein by reference.

FIELD OF THE DISCLOSURE

The present disclosure relates to the field of optical instrument and in particular, relates to laser devices including an air-cooled silicon carbide (SiC) clad $Nd:YVO_4$ slab laser device, and method for forming the laser devices.

BACKGROUND

Nowadays, liquid cooling is commonly used as a cooling method for laser devices. Although liquid cooling is effective, it is complex and inconvenient for design and experiment. In design, paths of cooling liquid, airtightness and other aspects must be taken into account. In practice, bulky cooling liquid circulating devices are often required, and appropriately arranging the liquid pipelines bring great inconvenience. Complexity of system design is increased and affects stability of operations. In addition, electric energy has to be consumed during liquid cooling, which increases total consumption of energy.

A liquid cooling method is disclosed in the publication, entitled "efficient diode double-end-pumped $Nd:YVO_4$ laser operating at 1342 nm", published in Optics Express 11, 2411 2003. However, this method is relatively complex and inconvenient for design and experiment. The disclosed devices and methods are directed to solve one or more problems set forth above and other problems.

BRIEF SUMMARY OF THE DISCLOSURE

One aspect of present disclosure includes an air-cooled laser device. The air-cooled laser device can include a first silicon carbide clad, a second silicon carbide clad, a first laser diode array, and a first cylindrical lens. The first silicon carbide clad can be bonded to a first surface of a laser active slab. The second silicon carbide clad can be bonded to a second surface of the laser active slab opposing the first surface. The laser active slab can further include side surfaces between the first surface and the second surface. The first silicon carbide clad and the second silicon carbide clad can be symmetrically configured and centered by the laser active slab. Each of the first and the second silicon carbide clads can have a surface area greater than a surface area of the first or the second surface of the laser active slab to form an air channel surrounding the side surfaces of the laser active slab and between the first and the second silicon carbide clads. The laser active slab can have a thickness to determine a thickness of the air channel for the air channel to form an air duct, while the thickness of the laser active slab is determined by heat dissipation, laser, and/or pump laser coupling system. The first laser diode array and the first cylindrical lens can be configured such that the first laser diode array emits first input pump laser beams to be collimated by the first cylindrical lens to provide parallel pump laser beams and quasi-parallel pump laser beams. The parallel pump laser beams and the quasi-parallel pump laser beams can be guided by the air duct to enter into the laser active slab from at least a first side surface of the laser active slab. In addition, the air duct facilitates the pump laser to be more uniformly propagated within the laser active slab.

Another aspect of present disclosure includes a method for forming an air-cooled laser device. A first silicon carbide clad can be bonded to a first surface of a laser active slab. A second silicon carbide clad can be bonded to a second surface of the laser active slab opposing the first surface. The laser active slab can further include side surfaces between the first surface and the second surface. The first silicon carbide clad and the second silicon carbide clad can be symmetrically configured and centered by the laser active slab. Each of the first and the second silicon carbide clads can have a surface area greater than a surface area of the first or the second surface of the laser active slab to form an air channel surrounding the side surfaces of the laser active slab and between the first and the second silicon carbide clads. The laser active slab can have a thickness to determine a thickness of the air channel for the air channel to form an air duct. A first laser diode array can be configured to emit first input pump laser beams. A first cylindrical lens can be configured to collimate the first input pump laser beams to provide parallel pump laser beams and quasi-parallel pump laser beams. The parallel pump laser beams and the quasi-parallel pump laser beams can be guided by the air duct to enter into the laser active slab from at least a first side surface of the laser active slab.

Other aspects or embodiments of the present disclosure can be understood by those skilled in the art in light of the description, the claims, and the drawings of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 1:
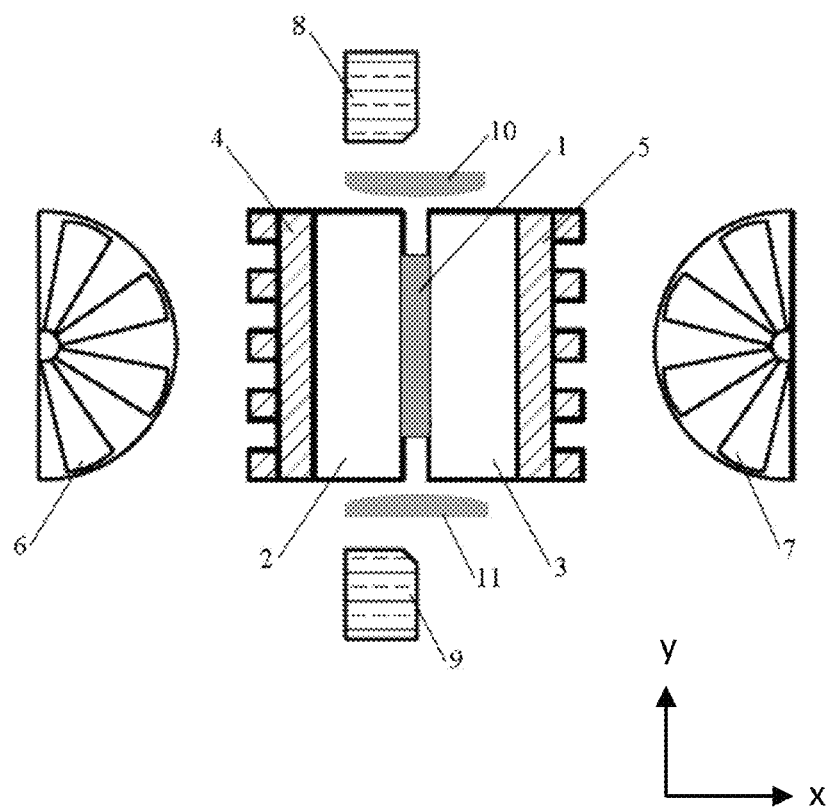
FIGS. 1-2 depicts an exemplary laser device including an air cooling device in accordance with various disclosed embodiments.
Figure 2:
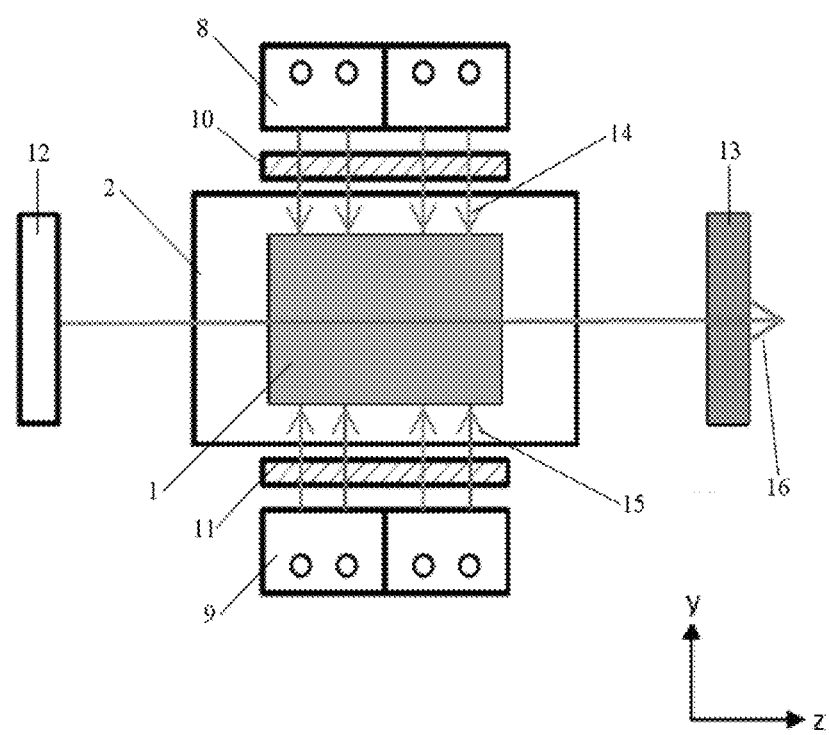

FIGS. 1-2 depict an exemplary laser device according to various embodiments of the present disclosure. The exemplary laser device may include an exemplary air cooling device.

As shown in FIGS. 1-2, the exemplary laser device includes: a laser active slab such as a $Nd:YVO_4$ slab 1, a first silicon carbide clad 2, a second silicon carbide clad 3, a first heat sink 4, a second heat sink 5, a first fan such as a first electric fan 6, a second first fan such as a second electric fan 7, a first laser diode array 8, a second laser diode array 9, a first cylindrical lens 10, a second cylindrical lens 11, a reflecting mirror 12, an output coupling mirror 13, first input pump laser beams 14, second input pump laser beams 15, and/or output laser beam 16. The first heat sink 4 and the second heat sink 5 can include copper heat sink with micro fins.

In one embodiment, the first and the second silicon carbide clads 2 and 3 are respectively bonded (e.g., diffusion bonded) to opposing surfaces of the Nd:YVO$_4$ slab 1 of the laser device. The first and the second heat sinks 4 and 5 are respectively disposed on the outer surfaces of the first and the second silicon carbide clads 2 and 3. The first electric fan 6 faces the first heat sink 4 and the second electric fan 7 faces the second heat sink 5.

The first silicon carbide clad 2, the first heat sink 4, and/or the first electric fan 6 are coaxially configured with the second silicon carbide clad 3, the second heat sink 5, and/or the second fan 7, respectively. The first and the second silicon carbide (SiC) clads 2 and 3 both have a surface area greater than a surface area of the Nd:YVO$_4$ slab 1 to form silicon carbide (SiC) claddings.

Each of the first and the second heat sinks 4 and 5 can include a copper block having micro-grooves/fins formed on an outer surface as shown in FIG. 1. Each of the first and the second heat sinks 4 and 5 can have an inner surface opposite to the outer surface. The inner surface of each of the first and the second heat sinks 4 and 5 can be closely connected (e.g., completely in contact) with one of the first and the second silicon carbide clads 2 and 3, respectively, to improve heat transfer therebetween.

Referring back to FIGS. 1-2, in operation, the Nd:YVO$_4$ slab 1 can be pumped from its side surfaces by laser diode arrays 8 and 9 form opposing sides of the Nd:YVO$_4$ slab 1. A resonant cavity is formed by the reflecting mirror 12 (which completely reflects light at laser wavelength) and the output coupling mirror 13 to provide output laser beam 16. By sandwiching the Nd:YVO$_4$ slab 1 between the silicon carbide clads 2 and 3 which have a high thermal conductivity, the heat generated by the Nd:YVO$_4$ slab 1 during the laser producing process can be rapidly transferred to the heat sinks 4 and 5 disposed respectively on both sides of the silicon carbide clads 2 and 3, and can further be dissipated from the laser device by the electronic fans 6 and 7 disposed respectively in a close proximity of the heat sinks 4 and 5. By utilizing such symmetrically designed structures on both sides of the Nd:YVO$_4$ slab 1, a direction of temperature gradient formed in the materials on each side of the Nd:YVO$_4$ slab 1 can correspond to the normal line direction of both surfaces of the Nd:YVO$_4$ slab 1. In this manner, the generated heat can be rapidly transferred along this normal line direction by the silicon carbide clads 2 and 3 to reduce the influence caused by thermal stress to the laser system to achieve high-energy laser output at room temperature without using liquid cooling.

In various embodiments, the present disclosure can achieve 100-watt-level laser output at room temperature by using certain materials. The fact that the thermal conductivity of silicon carbide is desirably high while its thermal expansion coefficient is very close to that of Nd:YVO$_4$ provides a basis for the present disclosure. There are many deficiencies in diffusion bonding the Nd:YVO$_4$ active material to a conventional copper heat sink. For example, conventional active material is extremely easy to be distorted and even fractured under thermal stress when the active material is heated. In addition, the copper material can absorb a part of the pump beam, thereby reducing the absorption efficiency of the pump beam. The present disclosure, however, adopts silicon carbide clads, on the one hand, the Nd:YVO$_4$ active material can be closely diffusion bonded to the silicon carbide clads by way of diffusion bonding to effectively transfer the waste heat.

Since these two materials have similar thermal expansion coefficients, heat distortion of the active material can match with that of the silicon carbide clads when the active material is heated, therefore, the fracture of the active material and the diffusion bonding layers can be effectively avoided. On the other hand, as silicon carbide material has an excellent optical property, the pump beam can transmit in the completely optical transparent silicon carbide material, thus resolving the issue of beam absorption existed in conventional copper heat sinks, and in this way, increasing the absorption efficiency and laser output efficiency of the system. Moreover, as the outside surfaces of the silicon carbide clads are in complete contact with the copper heat sinks, waste heat is transferred to the copper heat sinks by the silicon carbide materials with high thermal conductivity. And further, as the copper heat sinks have micro-grooves on outside surfaces, air flow provided by the fans can sufficiently contact with copper heat sinks and carry the waste heat off the laser device, so as to ensure a high-energy laser output. Compared with conventional liquid cooling devices, the present disclosure can obtain a high-power laser output by using a simplified structure, which shows the advantages of using the disclosed air cooling devices.

To achieve the features, functions, and/or advantages of the laser device described herein, in one embodiment, the Nd:YVO$_4$ slab 1 can have a thickness ranging from about 0.1 mm to about 2 mm, such as about 1 mm. The Nd:YVO$_4$ slab can have a width ranging from about 6 mm to about 10 mm such as about 8 mm. The Nd:YVO$_4$ slab can have a length ranging from about 20 mm to about 24 mm such as about 22 mm. The SiC clad can have a thickness ranging from about 3 mm to about 7 mm, e.g., about 5 mm; a width ranging from about 8 mm to about 12 mm, e.g., about 10 mm; a length ranging from about 25 mm to about 35 mm, e.g., about 30 mm. As used herein unless otherwise specified, in the figures, the thickness direction is along an X direction, the length direction is along a Y direction, and the width direction is along a Z direction, as indicated in FIGS. 1-4.

Figure 3:
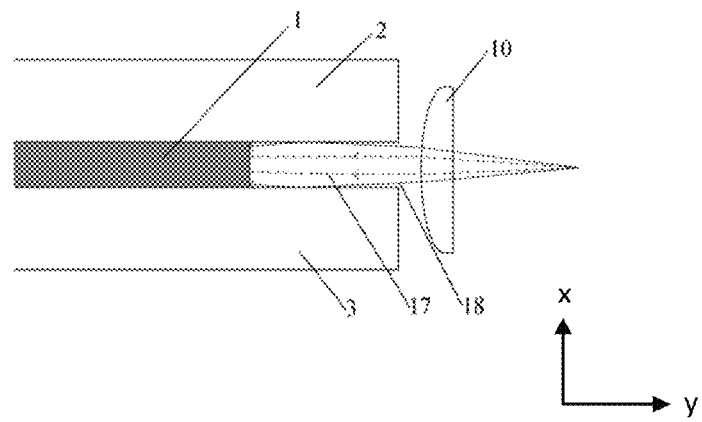
FIG. 3 depicts an exemplary edge pumping method of a laser device in accordance with various disclosed embodiments.
Figure 4:
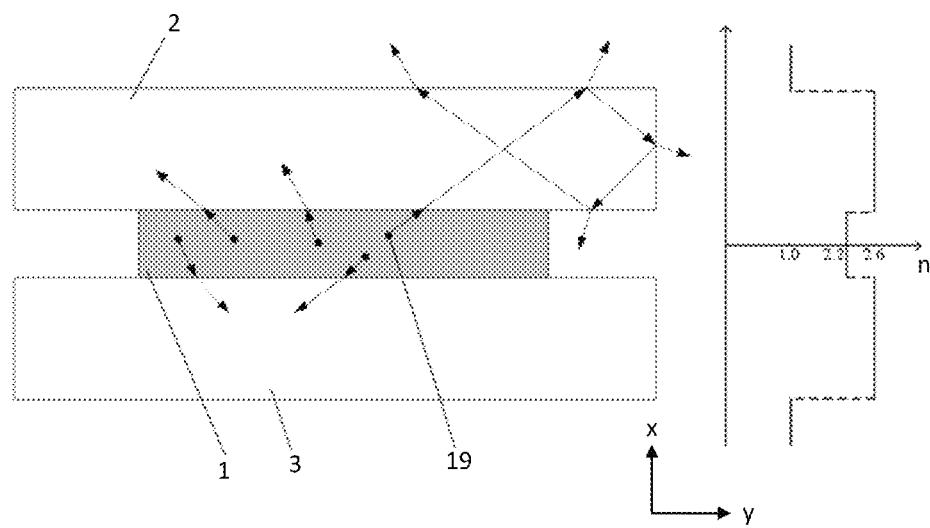
FIG. 4 is a schematic illustrating arbitrary propagation of spontaneous radiation photons in a laser active slab in accordance with various disclosed embodiments.

FIG. 3 depicts an exemplary edge pumping method consistent with the exemplary laser device, and FIG. 4 is a schematic illustrating arbitrary propagation of spontaneous radiation photons in the exemplary laser device in accordance with various disclosed embodiments. Specifically, FIGS. 3-4 illustrates parallel pump laser beams 17 emerged from the exemplary cylindrical lens 10, quasi-parallel pump laser beams 18 emerged from the exemplary cylindrical lens 10, and spontaneous radiation photons 19 propagated along an arbitrary direction in the Nd:YVO$_4$ slab 1 of the exemplary laser device.

Because the disclosed laser device has a completely symmetrical structure, FIG. 3 merely shows the optical paths on one side of the laser for simplicity of illustration. Referring to FIGS. 2-3, the first input pump laser beams 14 emitted from the first laser diode array 8 are collimated by the first cylindrical lens 10. Parallel pump laser beams 17 emerged from first cylindrical lens 10 enter into the active material of the Nd:YVO$_4$ slab 1 through a side surface of the Nd:YVO$_4$ slab 1. Quasi-parallel pump laser beams 18 are reflected at the interface between air and SiC material of the silicon carbide clads 2 and 3 by grazing incidence. In one embodiment, the silicon carbide clads 2 and 3 can be optically transparent. Because the refractive index of SiC is much higher than that of air, the 1-mm-thick air channel between the first SiC clad 2 and the second SiC clad 3 can function as a waveguide, e.g., to form an air duct (e.g., used as an air layer waveguide). This air duct can guide the quasi-parallel pump laser beams 18 to enter into the Nd:YVO$_4$ slab 1. In addition, the air duct can facilitate the pump laser to be more uniformly propagated within the laser active slab.

Likewise, symmetrically, parallel pump laser beams (not illustrated) and quasi-parallel pump laser beams (not illustrated) collimated by the exemplary cylindrical lens 11 from the second input pump laser beams 15 emitted from the second cylindrical lens 9 can be pumped into the laser active slab (e.g., the Nd:YVO$_4$ slab 1) via a side surface of the Nd:YVO$_4$ slab 1. This design realizes a more effective pump method and a much better absorption of the pump laser by the laser Nd:YVO$_4$ slab 1.

As disclosed, the Nd:YVO$_4$ slab 1 is clamped by two SiC clads 2 and 3. This design depresses the amplified spontaneous emission (ASE) efficiently. In FIG. 4, spontaneous radiation photons 19 can propagate along arbitrary directions from/in the Nd:YVO$_4$ slab 1. That Nd:YVO$_4$ is selected as a laser active material for the laser active slab 1 is because the refractive index n of Nd:YVO$_4$ is lower than that of SiC. So the spontaneous radiation photons 19 can transmit from the Nd:YVO$_4$ slab 1 into the SiC clads 2 and 3 and are dissipated by the SiC material. Compared with traditional slab laser without clads or with only one clad, the ASE is depressed efficiently by symmetrically bonding two SiC clads 2 and 3 to each surface of the Nd:YVO$_4$ active slab 1. The two SiC clads 2 and 3 can be identical.

Because the refractive index of the Nd:YVO$_4$ is also much higher than that of air, many spontaneous radiation photons 19 are guided in the laser active slab 1, which is induced by total reflection at the interface between air and laser active material. The laser active slab 1 functions as a waveguide, so some spontaneous radiation photons 19 can be amplified in the slab waveguide. More particles on excited state can be utilized for stimulated emission in Nd:YVO$_4$ slab 1. Output laser power can thus be increased.

Figure 5:
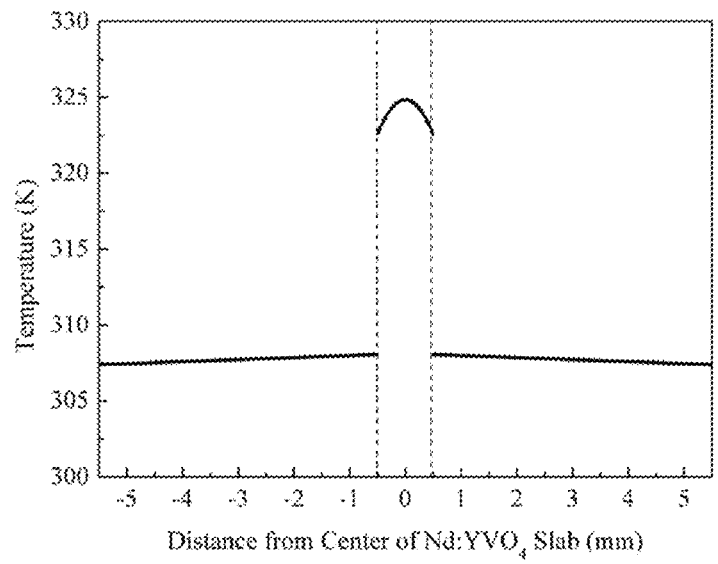
FIG. 5 depicts calculated temperature distribution along a thickness direction of a laser active slab in accordance with various disclosed embodiments.

FIG. 5 depicts calculated temperature distribution along a thickness direction by applying heat conduction equations and boundary conditions. As shown in FIG. 5, the curve between the two dashed lines illustrates the temperature distribution within the laser active slab 1, while each of the lines on both sides of the curve illustrates the temperature distribution within corresponding SiC clad 2 or 3 (e.g., as shown in FIG. 1). Room temperature can be about 300 K, and the total input pump power can be about 320 W. The highest temperature can be about 324 K, which appears in the center of the Nd:YVO$_4$ active slab 1 and is only about 24 K higher than the room temperature of 300 K. This confirms that, depending on the excellent thermal conductivity of the SiC clads 2 and 3, the waste heat generated in the laser active slab 1 is transferred to copper heat sinks 4 and 5 and is taken away by a cooling air flow. The temperature differences/steps between the Nd:YVO$_4$ slab 1 and each of the SiC clads 2 and 3 are caused by differences in thermal conductivity of the two materials.

Figure 6:
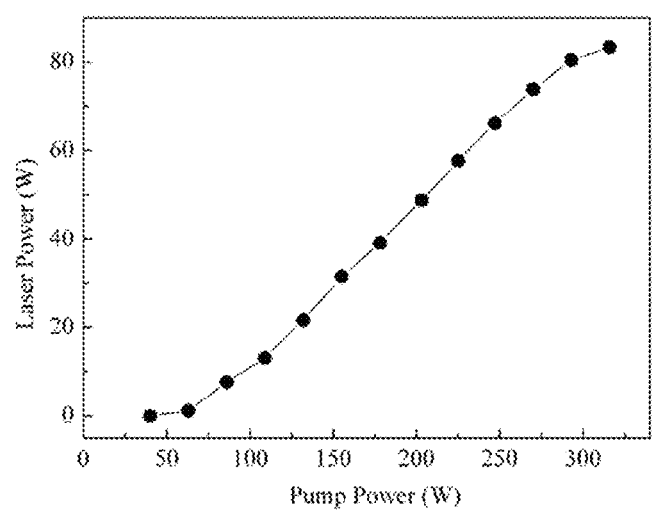
FIG. 6 depicts scalability of output power of an exemplary laser device in accordance with various disclosed embodiments.

FIG. 6 shows scalability of output power of an exemplary laser device. As shown, by using about 10% output coupling mirror, about 83 W continuous wave output power can be obtained without out using other manners but the cooling process as disclosed, i.e., air cooled.

As disclosed, an exemplary air-cooled laser device can include a first silicon carbide clad, a second silicon carbide clad, a first laser diode array, and a first cylindrical lens. The first silicon carbide clad can be bonded to a first surface of a laser active slab. The second silicon carbide clad can be bonded to a second surface of the laser active slab opposing the first surface. The laser active slab can further include side surfaces between the first surface and the second surface. The first silicon carbide clad and the second silicon carbide clad can be symmetrically configured and centered by the laser active slab. Each of the first and the second silicon carbide clads can have a surface area greater than a surface area of the first or the second surface of the laser active slab to form an air channel surrounding the side surfaces of the laser active slab and between the first and the second silicon carbide clads. The laser active slab can have a thickness to determine a thickness of the air channel for the air channel to form an air duct. The thickness of the laser active slab can be determined by heat dissipation, laser, and/or pump laser coupling system. The first laser diode array and the first cylindrical lens can be configured such that the first laser diode array emits first input pump laser beams to be collimated by the first cylindrical lens to provide parallel pump laser beams and quasi-parallel pump laser beams. The parallel pump laser beams and the quasi-parallel pump laser beams can be guided by the air duct to enter into the laser active slab from at least a first side surface of the laser active slab.

For forming an air-cooled laser device, a first silicon carbide clad can be bonded to a first surface of a laser active slab. A second silicon carbide clad can be bonded to a second surface of the laser active slab opposing the first surface. The laser active slab can further include side surfaces between the first surface and the second surface. The first silicon carbide clad and the second silicon carbide clad can be symmetrically configured and centered by the laser active slab. Each of the first and the second silicon carbide clads can have a surface area greater than a surface area of the first or the second surface of the laser active slab to form an air channel surrounding the side surfaces of the laser active slab and between the first and the second silicon carbide clads. The laser active slab can have a thickness to determine a thickness of the air channel for the air channel to form an air duct. A first laser diode array can be configured to emit first input pump laser beams. A first cylindrical lens can be configured to collimate the first input pump laser beams to provide parallel pump laser beams and quasi-parallel pump laser beams. The parallel pump laser beams and the quasi-parallel pump laser beams can be guided by the air duct to enter into the laser active slab from at least a first side surface of the laser active slab.

The disclosed laser devices and methods can also include a second laser diode array and a second cylindrical lens, configured such that the second laser diode array emits second input pump laser beams collimated by the second cylindrical lens to provide parallel pump laser beams and quasi-parallel pump laser beams. The parallel pump laser beams and the quasi-parallel pump laser beams can be guided by the air duct to enter into the laser active slab from at least a second side surface of the laser active slab.

The disclosed laser devices and methods can further include a first heat sink disposed on an outer surface of the first silicon carbide clad; and a second heat sink disposed on an outer surface of the second silicon carbide clad. The first heat sink and the second heat sink can be symmetrically configured and centered by the laser active slab. The first silicon carbide clad and the first heat sink can be configured to be coaxial with the second silicon carbide clad and the second heat sink, respectively. Each of the first heat sink and the second heat sink can include a copper block having micro fins on an outer surface. An inner surface of the copper block can be closely connected with one of the first and the second silicon carbide clads.

The disclosed laser devices and methods can still further include a first fan disposed facing the first heat sink, and a second fan disposed facing the second heat sink. The first and the second fans can be coaxially, symmetrically configured and centered by the laser active slab.

In a certain embodiment, the laser active slab can be Nd:YVO$_4$ and diffusion bonded to each of the first silicon carbide clad and the second silicon carbide clad. The first silicon carbide clad and the second silicon carbide clad can be substantially identical. The laser active slab can have a thickness of about 1 mm for forming the air duct.

The disclosed laser devices and methods can still further include a reflecting mirror configured to completely reflect lights at a laser wavelength, and an output coupling mirror configured such that the reflecting mirror and the output coupling mirror are configured at opposing sides of the laser active slab and are configured to form a resonant cavity.

In one embodiment, the first silicon carbide clad and the second silicon carbide clad can be bonded completely symmetrical to the laser active slab and/or the heat sink can be in complete contact with a corresponding silicon carbide clad to significantly increase depression of an amplified spontaneous emission (ASE) from the laser active slab.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. An air-cooled laser device comprising:
a laser active slab having a cuboid shape defined in x-axes, y-axes, and z-axes directions;
a first silicon carbide clad, bonded to a first surface of the laser active slab;
a second silicon carbide clad, bonded to a second surface of the laser active slab opposing the first surface and along the x-axes direction of the cuboid shape, the laser active slab further including side surfaces along the y-axes direction of the cuboid shape between the first surface and the second surface,
wherein the first silicon carbide clad and the second silicon carbide clad are symmetrically configured and centered by the laser active slab,
wherein each of the first and the second silicon carbide clads has a surface area greater than a surface area of the first or the second surface of the laser active slab to form an air channel surrounding the side surfaces of the laser active slab and between the first and the second silicon carbide clads, and
wherein the laser active slab has a thickness to determine a thickness of the air channel for the air channel to form an air duct;
a first laser diode array and a first cylindrical lens, configured such that the first laser diode array emits first input pump laser beams to be collimated by the first cylindrical lens to provide parallel pump laser beams and quasi-parallel pump laser beams, wherein the parallel pump laser beams and the quasi-parallel pump laser beams are guided by the air duct to enter into the laser active slab along the y-axes direction of the cuboid shape and from at least a first side surface of the laser active slab;
a reflecting mirror completely reflecting lights at a laser wavelength; and
an output coupling mirror, wherein the reflecting mirror and the output coupling mirror are configured at opposing sides of the laser active slab along the z-axes direction of the cuboid shape to form a resonant cavity.

2. The laser device according to claim 1, further including:
a second laser diode array and a second cylindrical lens, configured such that the second laser diode array emits second input pump laser beams collimated by the second cylindrical lens to provide parallel pump laser beams and quasi-parallel pump laser beams, wherein the parallel pump laser beams and the quasi-parallel pump laser beams are guided by the air duct to enter into the laser active slab from at least a second side surface of the laser active slab.

3. The laser device according to claim 1, further including:
a first heat sink disposed on an outer surface of the first silicon carbide clad; and
a second heat sink disposed on an outer surface of the second silicon carbide clad, wherein the first heat sink and the second heat sink are symmetrically configured and centered by the laser active slab.

4. The laser device according to claim 3, wherein:
the first silicon carbide clad and the first heat sink are configured to be coaxial with the second silicon carbide clad and the second heat sink, respectively.

5. The laser device according to claim 3, wherein:
each of the first heat sink and the second heat sink includes a copper block having micro fins on an outer surface, wherein an inner surface of each of the copper block is closely connected with one of the first and the second silicon carbide clads.

6. The laser device according to claim 3, further including:
a first fan disposed facing the first heat sink, and
a second fan disposed facing the second heat sink, wherein the first and the second fans are coaxially, symmetrically configured and centered by the laser active slab.

7. The laser device according to claim 6, wherein:
the laser active slab is Nd:YVO$_4$ and is diffusion bonded to each of the first silicon carbide clad and the second silicon carbide clad.

8. The laser device according to claim 1, wherein the laser active slab has a thickness of about 1 mm.

9. The laser device according to claim 1, wherein the first silicon carbide clad and the second silicon carbide clad are substantially identical.

10. A method for forming an air-cooled laser device comprising:
a laser active slab having a cuboid shape defined in x-axes, y-axes, and z-axes directions;
bonding a first silicon carbide clad to a first surface of the laser active slab;
bonding a second silicon carbide clad to a second surface of the laser active slab opposing the first surface and along the x-axes direction of the cuboid shape, the laser active slab further including side surfaces along the y-axes direction of the cuboid shape between the first surface and the second surface,
wherein the first silicon carbide clad and the second silicon carbide clad are symmetrically configured and centered by the laser active slab,
wherein each of the first and the second silicon carbide clads has a surface area greater than a surface area of the first or the second surface of the laser active slab to form an air channel surrounding the side surfaces of the laser active slab and between the first and the second silicon carbide clads, and
wherein the laser active slab has a thickness to determine a thickness of the air channel for the air channel to form an air duct;
configuring a first laser diode array to emit first input pump laser beams;
configuring a first cylindrical lens to collimate the first input pump laser beams to provide parallel pump laser beams and quasi-parallel pump laser beams, wherein the parallel pump laser beams and the quasi-parallel pump laser beams are guided by the air duct to enter into the laser active slab along the y-axes direction of the cuboid shape and from at least a first side surface of the laser active slab;

configuring a reflecting mirror to completely reflect lights at a laser wavelength; and configuring an output coupling mirror, wherein the reflecting mirror and the output coupling mirror are at opposing sides of the laser active slab along the z-axes direction of the cuboid shape to form a resonant cavity.

11. The method according to claim 10, further including:
configuring a second laser diode array to emit second input pump laser beams; and configuring a second cylindrical lens to collimate the second input pump laser beams to provide parallel pump laser beams and quasi-parallel pump laser beams, wherein the parallel pump laser beams and the quasi-parallel pump laser beams are guided by the air duct to enter into the laser active slab from at least a second side surface of the laser active slab.

12. The method according to claim 10, further including:
disposing a first heat sink on an outer surface of the first silicon carbide clad; and disposing a second heat sink on an outer surface of the second silicon carbide clad, wherein the first heat sink and the second heat sink are symmetrically configured and centered by the laser active slab.

13. The method according to claim 12, wherein:
configuring the first silicon carbide clad and the first heat sink to be coaxial with the second silicon carbide clad and the second heat sink, respectively.

14. The method according to claim 12, wherein:
each of the first heat sink and the second heat sink includes a copper block having micro fins on an outer surface, wherein an inner surface of each of the copper block is closely connected with one of the first and the second silicon carbide clads.

15. The method according to claim 12, further including:
disposing a first fan facing the first heat sink, and disposing a second fan facing the second heat sink, wherein the first and the second fans are coaxially, symmetrically configured and centered by the laser active slab.

16. The method according to claim 15, further comprising:
selecting a laser active material to have a refractive index lower than the first and second silicon carbide clads for the laser active slab, wherein the selected laser active material includes $Nd:YVO_4$ and the laser active slab is diffusion bonded to each of the first and second silicon carbide clads and wherein each of the first and the second silicon carbide clads is optically transparent.

17. The method according to claim 10, wherein the laser active slab has a thickness of about 1 mm for forming the air duct.

18. The method according to claim 10, wherein:
the first silicon carbide clad and the second silicon carbide clad are bonded completely symmetrical to the laser active slab such that depression of an amplified spontaneous emission (ASE) from the laser active slab is increased.

* * * * *